May 12, 1931.  G. LANGFORD  1,804,792

DIE

Filed May 16, 1929  4 Sheets-Sheet 2

Inventor:
George Langford.
By Byron, Jackson, Boettcher & Diemer
Attys.

May 12, 1931.  G. LANGFORD  1,804,792
DIE
Filed May 16, 1929   4 Sheets-Sheet 3

Inventor
George Langford
By Brown, Jackson, Boettcher & Dienner
Attys

May 12, 1931.  G. LANGFORD  1,804,792
DIE
Filed May 16, 1929    4 Sheets-Sheet 4

Inventor:
George Langford
By Brown, Jackson, Boettcher & Dienner
Attys.

Patented May 12, 1931

1,804,792

UNITED STATES PATENT OFFICE

GEORGE LANGFORD, OF JOLIET, ILLINOIS, ASSIGNOR TO McKENNA PROCESS COMPANY OF ILLINOIS, OF JOLIET, ILLINOIS, A CORPORATION OF ILLINOIS

DIE

Application filed May 16, 1929. Serial No. 363,638.

This invention relates to dies, and more particularly to dies for use in reforming rail joint angle bars comprising elements disposed closely adjacent in such manner as to necessitate the provision of a relatively thin knife or blade in one of the dies for accurately forming the fishing surfaces of such elements.

As is well known in the art, rail joint bars which have been in service for some time become worn away at the central portion of their fishing surfaces to such an extent as to necessitate replacement. A bar which has been thus worn, if of the angle or I-beam type, can be readily reformed under pressure in dies to accurately restore its fishing surfaces and height. Continuous bars have a base which, when the bar is applied in a joint, extend inwardly beneath the flange of the rail. This base is provided, at the inner portion of its upper face, with a fishing surface which is opposed to the fishing surface of the flange for tightly gripping the rail flange.

After a continuous type of bar has been in service for some time, the fishing surfaces thereof become worn at the center portion of the bar, and the base becomes corroded, to such an extent as to necessitate replacement. In a continuous bar, the space or gap between the base and the flange is restricted and, for this reason, it is extremely difficult and, in fact, impossible under present practice, to reform such a bar without first opening the base, that is, spreading the base away from the flange. The reason for this is that if it were attempted to reform a continuous type of bar with the base in normal operative relation to the flange, in dies of known construction, the element of the die which would have to be provided to enter between the base and the flange would be so thin as to be broken under the pressure to which it would unavoidably be subjected in the operation of reforming of the bar. To accurately reform the fishing surfaces of the bar, sufficient pressure must be exerted thereon at proper points to displace a certain amount of the metal and redistribute it in such manner as to accurately restore the fishing surfaces and height of the bar. An element or blade of sufficient thinness to enter the gap of a continuous bar must, necessarily, be quite thin and, if used in dies of present day construction employed for reforming rail joint bars, would inevitably break under the pressure to which it is subjected in the reforming operation.

While it is impossible to reform continuous bars in dies of present day construction, without spreading or opening the base of the bar, I have found that it is possible to satisfactorily reform continuous bars in a single operation by properly constructing the dies.

In accordance with my invention, I provide one of the dies with a relatively thin element in the form of a blade which is of proper size and shape to fit snugly into the space between the flange and the base of a continuous bar when the base is in its normal folded or closed position. I provide a second die which cooperates with the first die in reforming of the bar, this second die being constructed in such manner as to exert equal pressure on the blade of the first die at opposite sides thereof and simultaneously so that the pressure in one direction is counteracted by the pressure in the other direction. This eliminates subjecting the thin blade to excessive lateral pressure in either direction, and the simultaneous and opposite pressures exerted on the lateral faces of the blade or, more correctly, on the flange and the base of the bar, act to reform the fishing surfaces of the flange and the base with precision by forcing the same against the lateral fishing forming surfaces of the blade of the die. I thus render is possible to accurately reform a continuous bar in a single operation as distinguished from the present practice in which it is necessary to first spread or open the base away from the flange, after which the fishing surfaces of the head and the flange are reformed and the base is then folded back into position, thus necessitating three operations, as compared to the one operation when dies constructed in accordance with my invention are used. A further objection to the present practice is that the bar is subjected to undesirable stresses when folding the base back into closed position and, as considerable pressure is required to accomplish this, the bar is frequently distorted and the accuracy of the fishing surfaces and height of the bar is destroyed.

I avoid this objection by reforming the bar in a single operation.

A further object of my invention is to provide a die structure comprising separable sections and means associated therewith for separating such sections after the reforming of the bar is completed, thus opening one of the dies so as to facilitate removal therefrom of the reformed bar. Further objects and advantages of my invention will appear from the detailed description.

Figure 1:
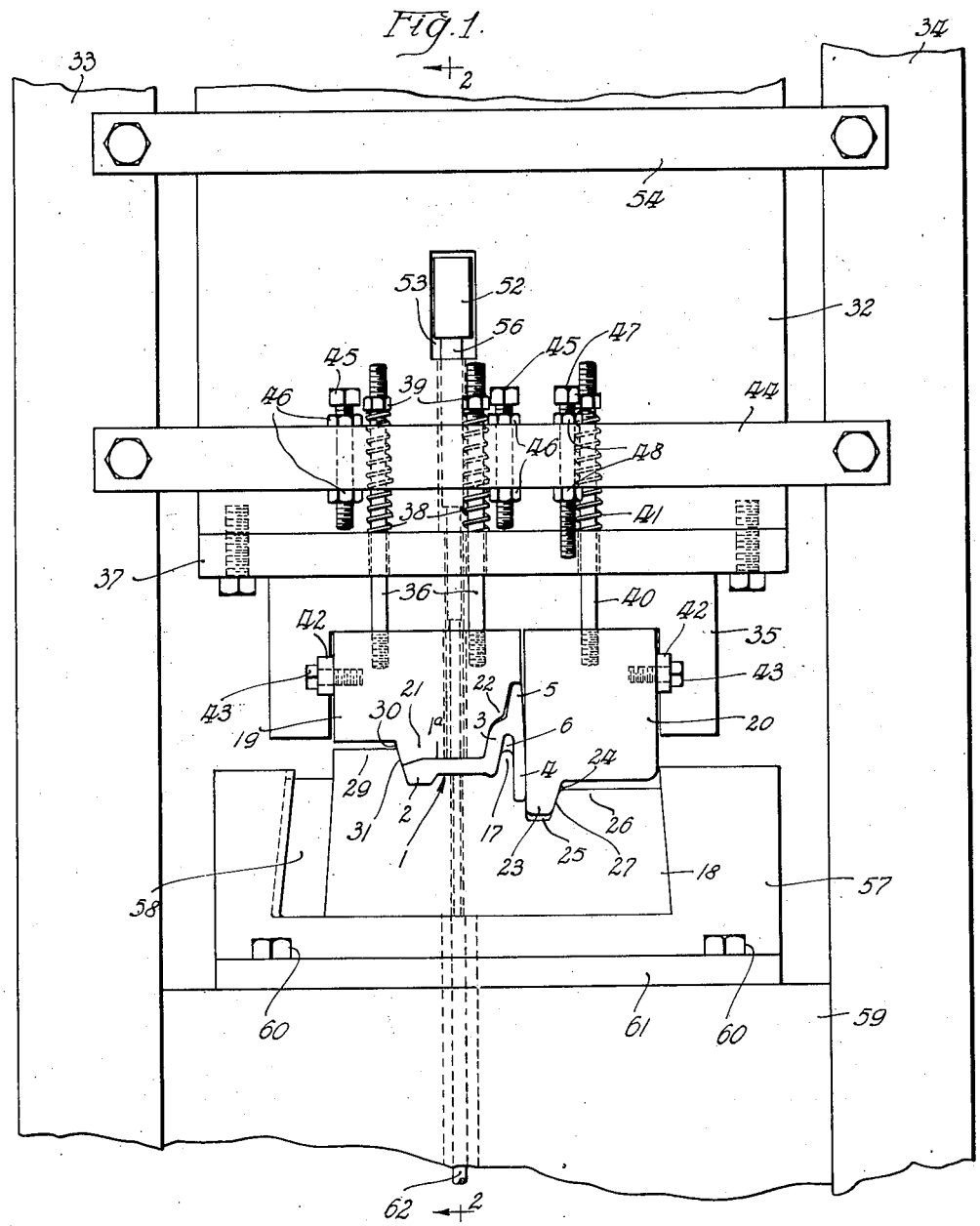
Figure 1 is an end view of a pair of dies constructed in accordance with my invention, as applied in a press for reforming a continuous bar.

In Figure 1 of the drawings, I have illustrated a continuous bar 1 being reformed by a set of dies constructed in accordance with my invention. This bar and its relation to the die elements during the reforming operation is illustrated more clearly in Figure 3. The bar comprises a web 1ª, head 2, flange 3, base 4, and a point 5, which constitutes an extension of the base.

The base 4, when in closed or folded position, forms, with flange 3, a restricted space or gap 6 for reception of the rail flange. This base is provided with a fishing surface 7—8, which is opposed to a fishing surface 9—10 on the under face of flange 3. The head 2 of the bar is also provided with a fishing surface 11—12 which, when the bar is applied, fits accurately the corresponding fishing surface of the rail head. It is essential that all of the fishing surfaces of the bar be accurately formed and that the fishing height of the bar be precise in order to obtain the proper fit of the bar to the rail. It is also essential that the fishing surfaces 9—10 and 7—8 be accurately spaced so as to effectively grip the flange of the rail. It will be noted that the gap 6 is quite narrow and a forming element of the die capable of entering into this gap must also be relatively thin. In the reforming of a continuous bar, it is necessary to subject the bar to pressure applied to the upper face of the flange 3 at 13—14, and to pressure applied to the under face of base 4 at 15—16. The pressure applied on these areas must be comparatively great in order to properly draft the bar so as to accurately reform the fishing surfaces 9—10 and 7—8 by the coacting lateral faces of a forming element, in the shape of the blade 17, which projects into the gap 6. In dies of present day construction used in the production of rail joint angle bars, the use of an element of sufficient thinness to enter the gap 6 of a continuous bar is impossible since, in such dies, this element would be subjected to relatively great pressure from one side only thereof, and this pressure would inevitably result in breakage of the thin forming element extending into the gap of the bar.

Figure 3:
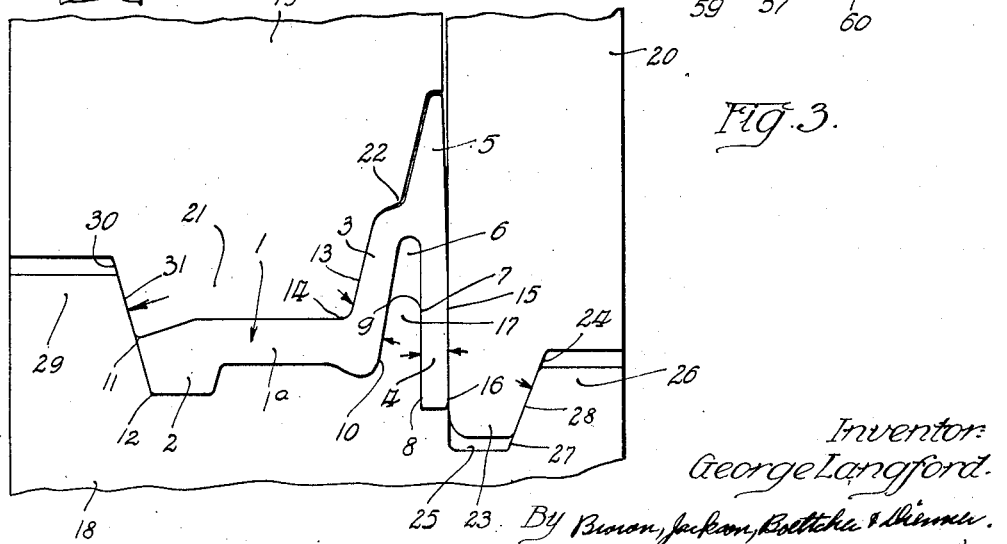
Figure 3 is an end view, on an enlarged scale, of the dies, and a bar being reformed thereby, the dies being shown in full closed position.

I have found that it is possible, by employing a novel form of die construction, to accurately reform a continuous bar in a single operation and while the base 4 thereof is in its closed or folded position. In Figure 3, I have illustrated a lower die 18 provided, in its upper face, with a suitable forming cavity and associated forming surfaces, this cavity receiving the bar 1 disposed therein with the flange 3 directed upwardly. The relatively thin blade 17 which enters into gap 6 of the bar is formed integrally with the die 18. This lower die cooperates with an upper die which comprises a bar section 19 and a base section 20. This bar section comprises an extension 21, adapted to enter the cavity of the lower die and having forming surfaces suitably shaped and disposed to draft the upper face of flange 3 and the outer face of web 1ª of the bar for accurately restoring the fishing surfaces and fishing height thereof. Section 19 is provided in the lateral face thereof adjacent section 20 with a recess 22 of approximately the same shape as point 5 and the upper portion of flange 3, this recess being of proper size to provide some clearance about the point and the upper portion of the flange, as shown in Figure 3.

Section 20 is provided with a depending shoulder 23, the outer lateral face 24 of which is inclined downwardly and inwardly of die 18. This shoulder is adapted to enter into a pass 25 in the upper face of die 18, this pass being contiguous to and parallel with the base receiving recess in the adjacent lateral face of blade 17. The lower die 18 is also provided with a shoulder 26, the inner lateral surface 27 of which is inclined similarly to surface 24 of shoulder 23. The two inclined surfaces 24 and 27 contact as the dies are closed and constitute a die lock 28 for forcing die section 20 inwardly so as to exert forming pressure on base 4, this lock also effectively holding the die section 20 against movement in the opposite direction.

The lower die 18 is also provided with a shoulder 29 at the other side of the die cavity, the inner lateral face of this shoulder being inclined downwardly and inwardly of the die and coacting with a similarly inclined surface 30 of projection 21 of die section 19 to provide a die lock 31.

In practice, the lower die 18 is fixed and the upper die, comprising the sections 19 and 20, is movable toward and away from the lower die by a suitable means capable of exerting the desired pressure for accurately reforming the bar. The sections 19 and 20 of the upper die are loosely supported in a suitable manner for relative movement toward and away from each other. The bar to be reformed is placed in the lower die 18 in the position illustrated and the upper die is then moved into its full closed position under pressure. As the top die descends, section 19 thereof is shifted slightly toward the left, as considered in Figure 3, by contact of projection 21 with flange 3 of the bar. As the die is moved into full closed position, it is shifted in the opposite direction, that is, toward the right, by the die lock 31 and reacts so as to exert pressure at 13—14 on the upper face of flange 3 of the bar, this pressure being in a diagonal direction as indicated by the arrow, so as to accurately form the fishing surface 9—10. The pressure applied at 13—14 is transmitted to the blade 17 by the fishing surface 9—10 and would tend to bend or break the blade if proper provision were not made to counteract this pressure. This is accomplished by the base die section 20. This section moves into closed position with section 19 and the two sections of the upper die are subjected to pressure simultaneously. At the same time that section 19 is shifted toward the right so as to draft the bar at 13—14, section 20 is shifted in the opposite direction by the contacting surfaces 24 and 27 constituting the die lock 28.

This serves to apply pressure to base 4 at the under face thereof at 15—16 and in the direction of the arrow, so as to force the upper face of the base against the adjacent lateral face of blade 17 under proper pressure to accurately form the fishing surface 7—8. The pressure exerted at the outer side of the blade for forming the fishing surface 7—8 of the base 4 reacts on the blade so as to counteract the pressure applied for forming the fishing surface 9—10, as indicated by the arrow, and the pressure applied for forming the fishing surface 9—10 reacts in the opposite direction on the blade to counteract the pressure applied at 7—8, as indicated by the arrow, it being noted that the lock 28 not only serves to force section 20 toward base 4, but also to hold this section against movement in a direction away from the base. Lock 31 also acts to hold the projection 21 of die section 19 against movement away from flange 3 of the bar. It will thus be seen that by constructing the dies in the manner illustrated and described, the required pressure for accurately reforming the fishing sufaces of the flange and the base of a continuous bar are applied simultaneously at the opposite sides of the thin blade 17, so that these pressures counteract each other, the blade being subjected to compression from the opposite sides thereof, only, and not to excessive lateral pressure, such as would be apt to cause bending or breakage of this blade. In this manner, I render it possible to accurately reform a continuous bar in a single operation and while the base of the bar is in its normal operative relation to the flange thereof.

This I believe to be broadly new. While I have described my method as applied to reforming a worn continuous bar, it is also well adapted for use in finally forming continuous bars which have been rolled to approximately final shape. It is also to be understood that continuous bars, either new or worn, can be crowned or not, as desired, during the reforming or forming thereof in the dies, this all being accomplished in a single operation. While I have illustrated the bar as disposed in the lower die with the flange 3 directed upwardly, this bar can be arranged in the die in various ways and either one or both of the dies can be movable, as desired.

In Figure 3, I have shown the bar 1 disposed perpendicular to the line of pressure. I contemplate, however, disposing the bar at an inclination of several degrees to the line of pressure, inclining it slightly by positioning the flange point 5 somewhat higher than illustrated in Figure 3, with the position of point 11 of the head remaining unchanged. With the bar disposed in this manner, the base 4 of the bar, and blade 17, would be inclined slightly and the inner face of section 20 of the upper die, which contacts base 4, would be similarly inclined.

Figure 6:
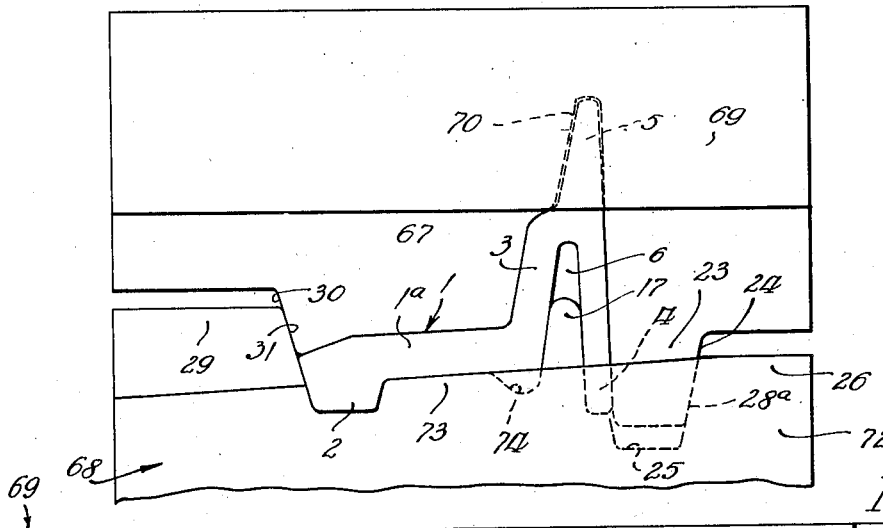
Figure 6 is an end view of a die structure and a bar therein, illustrating a second modified form of upper and lower dies.

This is advantageous as preventing sticking of the bar at the blade, at the flange point 5 and at the base portion 4, and it also provides better approach of the top die to the bar due to the inclined surfaces of the dies presenting themselves to inclined surfaces of the bar. With the bar disposed in this manner, the lock 28 may be almost vertical to avoid undue pressure on base 4, as illustrated in Figure 6.

Figure 2:
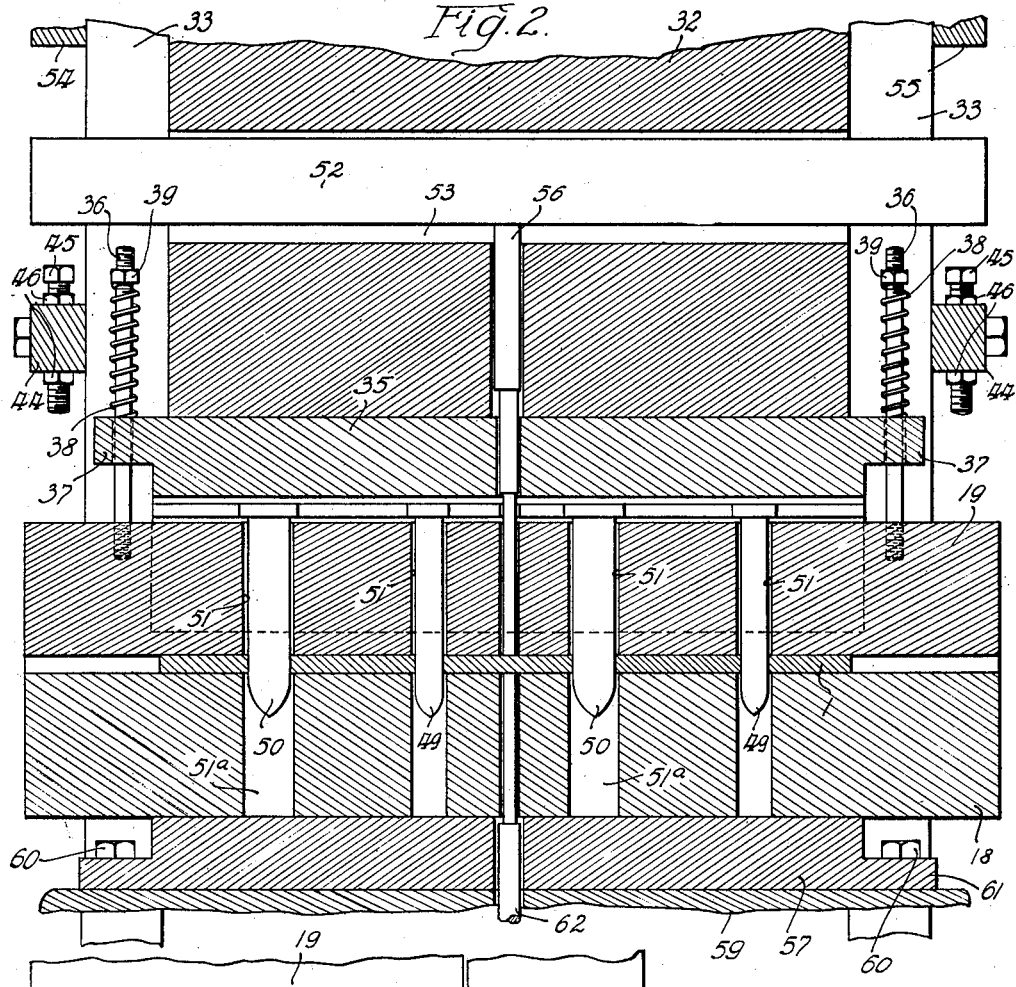
Figure 2 is a vertical sectional view taken substantially on line 2—2 of Figure 1, parts being shown in elevation.

In Figures 1 and 2, I have illustrated a set of dies constructed in accordance with my invention as used in a press. The press comprises a cross head 32, which operates between uprights 33 and 34. An upper die holder 35 is bolted to head 32 and loosely receives sections 19 and 20 of the upper die structure.

Section 19 is normally held in raised position in the holder 35 by rods 36, which have their lower ends secured in section 19, these rods passing through end flanges 37 of the holder, which form abutments for the lower ends of expansion coil springs 38 mounted about the rods and confined between flanges 37 and abutment members in the form of nuts 39 screwed upon the upper ends of the rods. Section 20 is normally held raised in the holder 35 in a similar manner by rods 40 and springs 41. The two sections 19 and 20 are held against endwise movement through the holder 35 by collars 42 mounted for turning movement upon cap screws 43, which are screwed into the die sections from the outer lateral faces thereof, the collars 42 constituting rollers, which bear against the ends of the die holder 35.

The width of the recess of this holder is somewhat greater than the combined widths of the die sections 19 and 20, these sections being spaced a slight distance apart when the upper die structure is in open position and the outer lateral face of section 19 being spaced a slight distance away from the adjacent inner lateral face of the holder at such time. This mounting of the die sections permits the relative lateral shifting of the sections toward and away from each other during the operation of the dies previously referred to.

A lower bar 44 is secured to the uprights 33 and 34 and extends across the cross head 32 at the opposite faces thereof. Each of these bars receives two stop members 45 which extend vertically through the bar and have their lower ends disposed to contact the end portions of die section 19 which projects beyond the ends of the holder 35, as illustrated in Figure 2. The stop members 45 may conveniently be in the form of bolts which are secured in adjustment in the bar 44 by nuts 46 screwing thereon and contacting the upper and lower faces of the bar. Abutment members 47 similar to the members 45 are adjustably secured in bars 44, by nuts 48, and are disposed to contact the projecting end portions of die section 20. The members 47 extend downwardly a greater distance than the members 45 so that, as the cross head 32 is raised, section 20 contacts the abutment members 47 in advance of contact of section 19 with the members 45. During the continued upward movement of the cross head, die section 20 is held against upward movement so as to be, in effect, partially withdrawn from the holder 35. This serves to open the upper die structure so as to loosen the bar 1 therein.

The die section 19 then contacts the stops 45 so as to be held against upward movement during the remainder of the continued upward movement of the cross head. This serves to strip the bar from pins which may be used to conform the bolt holes in the bar accurately to proper size and spacing. This stripping of the bar from the pins, combined with the preliminary loosening of the bar by the opening of the upper die structure is usually sufficient to cause the bar to drop of its own accord from the upper die. I prefer, however, to provide positive means for stripping the bar from the upper die.

In Figure 2, I have shown the pins for conforming the bolt holes in the bar accurately to size and spacing, as well as knock out pins for stripping the bar from either the upper die or the lower die. I provide round pins 49 and oval pins 50, which I dispose in alternate relation for entering the holes in bar 1, this bar having four holes, as is the common practice. The pins 49 and 50 are suitably supported in the die holder 35 and depend therefrom through suitable openings 51, which extend through the section 19 of the upper die. These openings 51 are aligned with openings 51$^a$ in the lower die 18 as the dies are closed. It will be noted that the openings 51 and 51$^a$ are somewhat larger than the pins so as to permit of the shifting of the upper die section 19 previously referred to. The pins act to conform the holes in the bar accurately as to form, size, and spacing during the reforming of the bar.

If the bar adheres to the pins, it is stripped therefrom after separation of the sections of the upper die and during the continued upward movement of the cross head, in the manner previously described.

A stripping bar 52 extends through an opening 53 in the cross head 32 and projects beyond the opposite faces thereof. The ends of this bar are disposed to contact the cross bars 54 and 55, which are secured to the uprights 33 and 34 and extend across the opposite faces of the cross head, as the cross head approaches the limit of its upward movement. This bar carries a knock out pin 56, which extends through aligned openings in the cross head and the die holder and die section 19, the lower end of this pin contacting the web of the bar 1 at the center thereof. If the bar does not drop from the upper die section 19 when the pins 49 and 50 are withdrawn, the projecting ends of stripping bar 52 strike the cross bars 54 and 55, thus positively stopping upward movement of bar 52. The cross head 32 continues its upward movement slightly beyond this point and, during such movement of the cross head, the pin 56 acts to positively strip bar 1 from the die section 19. I thus provide positive stripping means for removing the bar from the upper die section 19 in the event it adheres to this section after withdrawal of the pins 49 and 50.

The lower die 18 is secured in a die holder 57 by a wedge bar 58. This die holder is secured to bed 59 of the press in a suitable manner, as by means of cap screws 60 which pass through base flanges 61 of the holder 57 and screw into the press bed 59.

I also provide a knock out pin 62 for the lower die which operates in a known manner to strip the bar therefrom when this bar adheres to the lower die.

Figure 5:
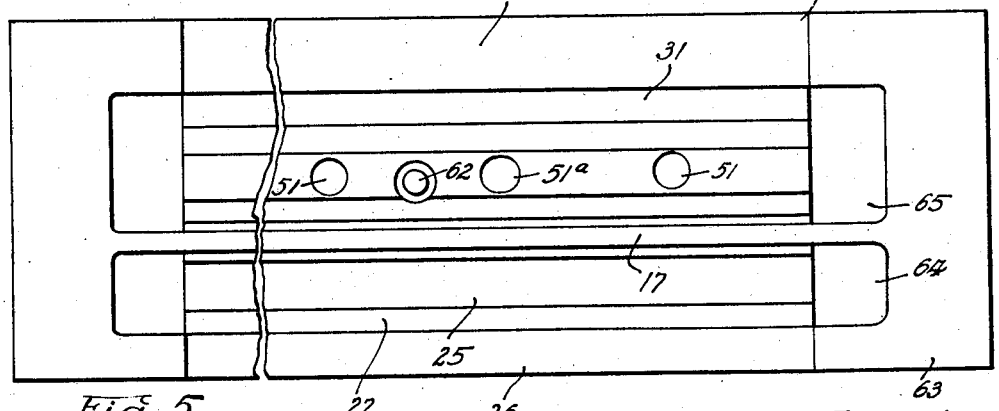
Figure 5 is a plan view of a modified form of lower die.

In the modified form of lower die illustrated in Figure 5, the die 18ª is closed at each end by a relatively heavy end wall 63. This wall is provided with two pockets or recesses 64 and 65, which open into the pass 25 at one side of the blade 17 and the flange pass at the other side of the blade, respectively. These pockets or recesses are of proper depth and size to accommodate tools for planing or dressing the walls of the passes and the blade 17. The passes for the web and the head of the bar also open into the pocket 65.

Figure 4:
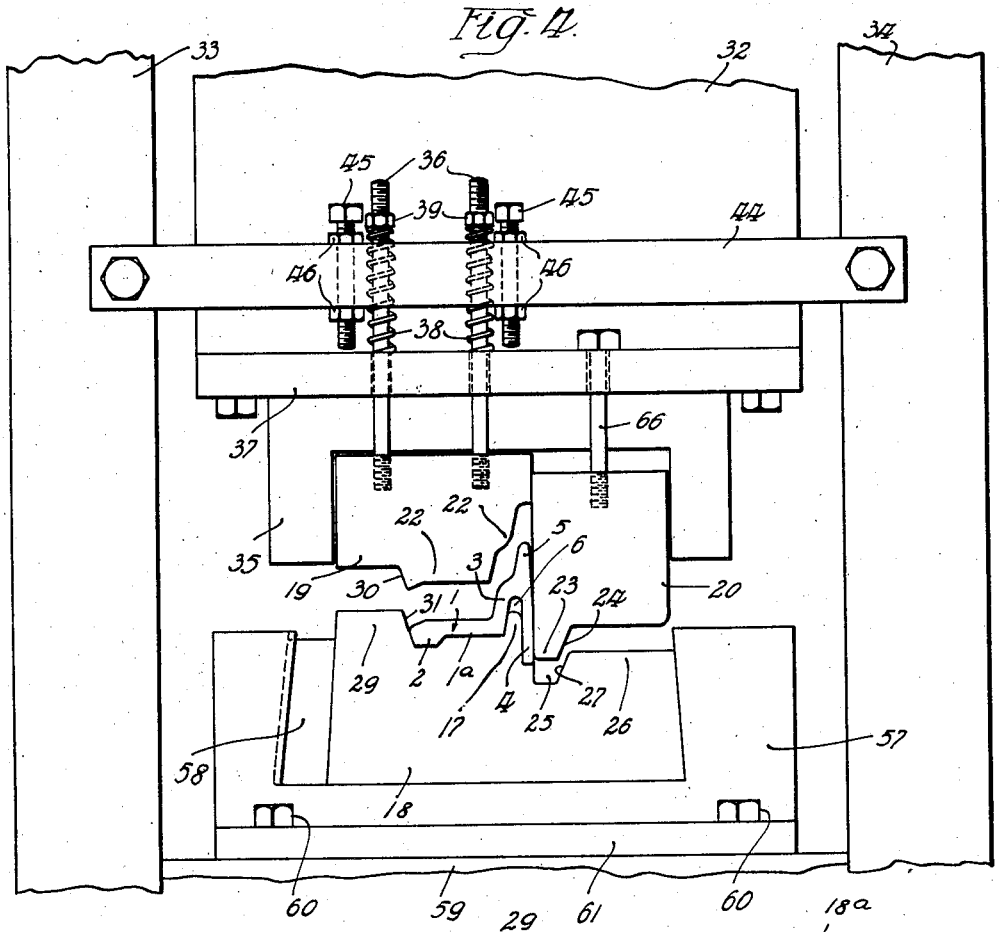
Figure 4 is a view similar to Figure 1, illustrating a modified form of die construction.

In Figure 4, I have illustrated a modified form of mounting the sections of the upper die structure. In this form, section 19 is supported as in Figure 1 and section 20 is supported by bolts 66, which pass loosely through end flanges 37 of the die holder 35. When the holder 35 is in its raised position, section 20 depends from flanges 37 so as to be spaced away from the base of the holder, as illustrated. As the dies begin to close, the base section 20 is guided into position by the cooperating shoulders 23 and 26 and, when pressure is applied to the two sections of the upper die structure, these sections act to form the bar, in conjunction with the lower die, in the manner previously described. Upon raising of the upper die structure, the base section 20 thereof remains immovable until after section 19 has been raised off of the bar. The base section thus acts to hold the bar in the lower die during the raising of section 19 of the upper die structure. During the continued upward movement of the cross head, base section 20 is raised by bolts 66 into inoperative position, the bar remaining in the lower die from which it is stripped by the knock out pin 62.

By this construction, the base grip of the bar is held true until all of the strain of pressure on the bar has been relieved. This is advantageous as assuring accuracy in the base grip of the bar as finally formed.

Figure 7:
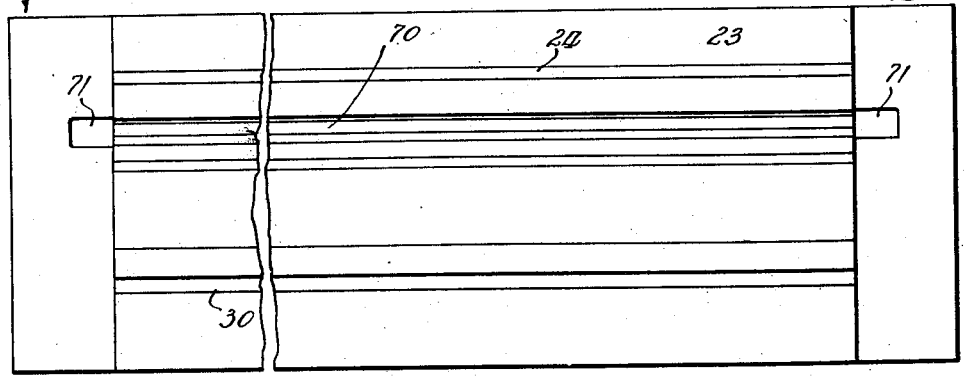
Figure 7 is an underneath view of the upper die of Figure 6.
Figure 8:
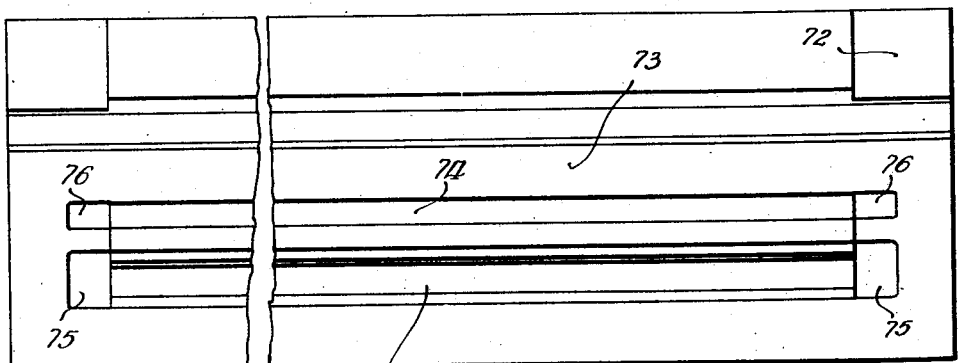
Figure 8 is a plan view of the lower die of Figure 6.

In Figure 6, I have illustrated a one-piece upper die 67 and a one-piece lower die 68. Referring to Figure 7, die 67 is provided with end walls 69, which bridge the ends of pass 70 provided for reception of point 5 of the bar flange, these walls having pockets 71 aligned with the ends of the pass and of a depth to accommodate tools for dressing the walls thereof. End walls 69 are of less vertical thickness than the body of the die, to avoid interference with proper closing of the dies.

The lower die 68, of Figure 6, is provided with end walls 72 the upper faces of which are inclined downwardly from the inner edge of shoulder 26 to the inner corners of the web contacting projection 73 of such die. These walls bridge the pass 25 and the pass 74 for the heel of the bar. The end walls 72 are provided with pockets 75 and 76 aligned with the ends of the passes 25 and 74, respectively, and of proper depth to accommodate suitable tools for dressing the walls of these passes. If desired, the end walls 72 may bridge the ends of the head and web passes of die 68, though ordinarily this is not necessary. Also, under certain conditions, either of the passes 25 or 74 may be continued through the end walls, the remaining pass only being bridged by these walls. I also contemplate omitting either of the end walls in either die 67 or upper die 68, if conditions warrant this being done. This also applies to the die of Figure 5, in which either end wall may be omitted.

The bar 1, in Figure 6, is inclined at an angle of several degrees to the horizontal so as to be slightly inclined to the direction of pressure, as above referred to in discussing Figure 3. This disposes the base 4 of the bar at an inclination, with the right hand face of blade 17 and the cooperating inner face of die 67 similarly inclined. The die lock 28ª is nearly vertical, being but slightly inclined, compared to the die lock 28 of Figure 3. This prevents the application of excessive pressure to base 4 of the rail and, consequently, to blade 17 of the lower die at one side thereof. By boxing the upper die so as to effectively reenforce the thin portion thereof, which is unavoidable due to the necessity of providing a deep pass to accommodate point 5 of the bar, I am enabled to use a one-piece upper die. When using an upper die of this type, I preferably dispose the bar at an inclination to the horizontal, as in Figure 6, though this is not essential in all cases and the bar may be otherwise disposed to suit special conditions.

What I claim is:

1. In combination in means for reforming rail joint angle bars of the continuous type, a press comprising a bed and a cross head, a lower die fixed to the bed and having a bar receiving cavity and an upwardly projecting blade adapted to enter between the base and the flange of the bar, an upper die holder carried by the cross head, an upper die comprising two sections mounted in the holder for relative movement toward and away from each other, means for supporting said sections in the holder for relative vertical movement therein, stops disposed to contact the sections of the upper die during upward travel thereof with the cross head, certain of the stops contacting one of the upper die sections in advance of contact of the other stops with the other of said sections, and means for forcing the sections of the upper die toward each other as the dies are closed under pressure.

2. In combination, a press comprising a bed and a cross head, a lower die fixed to the bed and having an upwardly projecting element, an upper die holder carried by the cross head, an upper die comprising two sections mounted in the cross head for relative movement toward and away from each other, means for supporting said sections in the holder for relative vertical movement therein, stops disposed to contact the die sections in the upward travel thereof with the cross head, certain of the stops being disposed to contact one of said sections in advance of contact of the other stops with the other section, and means for forcing the sections of the upper die toward each other as the dies are closed under pressure.

3. In combination, a press comprising a bed and a cross head, a lower die fixed to the bed and having an upwardly projecting element, an upper die holder carried by the cross head, an upper die comprising two sections mounted in the cross head for relative movement toward and away from each other, means for supporting said sections in the holder for relative vertical movement therein, stops disposed to contact one of the die sections during upward travel thereof with the cross head, and means for forcing the sections of the upper die toward each other as the dies are closed under pressure.

4. In combination, a press comprising a bed and a cross head, a lower die fixed to the bed and having an upwardly projecting element, a die holder carried by the cross head, an upper die comprising two sections mounted in the cross head for relative movement toward and away from each other, one of said sections having free vertical movement in the holder independently of the other section, and means for forcing the sections of the upper die toward each other as the dies are closed under pressure.

5. In combination in means for reforming rail joint bars, a press comprising a bed and a cross head, a lower die fixed to the bed and having an upwardly projecting element, a die holder carried by the cross head, an upper die comprising two sections mounted in the cross head for relative movement toward and away from each other, one of said sections having free vertical movement in the holder independently of the other section, yielding means normally holding the other section raised in the holder, pins projecting beyond the lower face of said other section for conforming the bolt holes in the bar accurately to size and spacing, stops disposed to contact the pin carrying section of the upper die during upward travel thereof with the cross head, and means for forcing the sections of the upper die toward each other as the dies are closed under pressure.

6. In combination in means for reforming rail joint bars, a press comprising a cross head and a bed, a lower die fixed to the bed and having an upwardly projecting element, a die holder carried by the cross head, an upper die comprising two sections mounted in the holder for relative movement toward and away from each other, yielding means normally holding the die sections in raised position in the holder, pins projecting beyond the lower face of one of said sections for conforming the bolt holes in the bar accurately to size and spacing, stops disposed to contact the sections of the upper die during upward travel thereof with the cross head, certain of said stops being disposed to contact the other section of the upper die in advance of contact of the other stops with the pin carrying section, and means for forcing the sections of the upper die toward each other as the dies are closed under pressure.

In witness whereof, I hereunto subscribe my name this 29th day of April, 1929.

GEORGE LANGFORD.